UNITED STATES PATENT OFFICE.

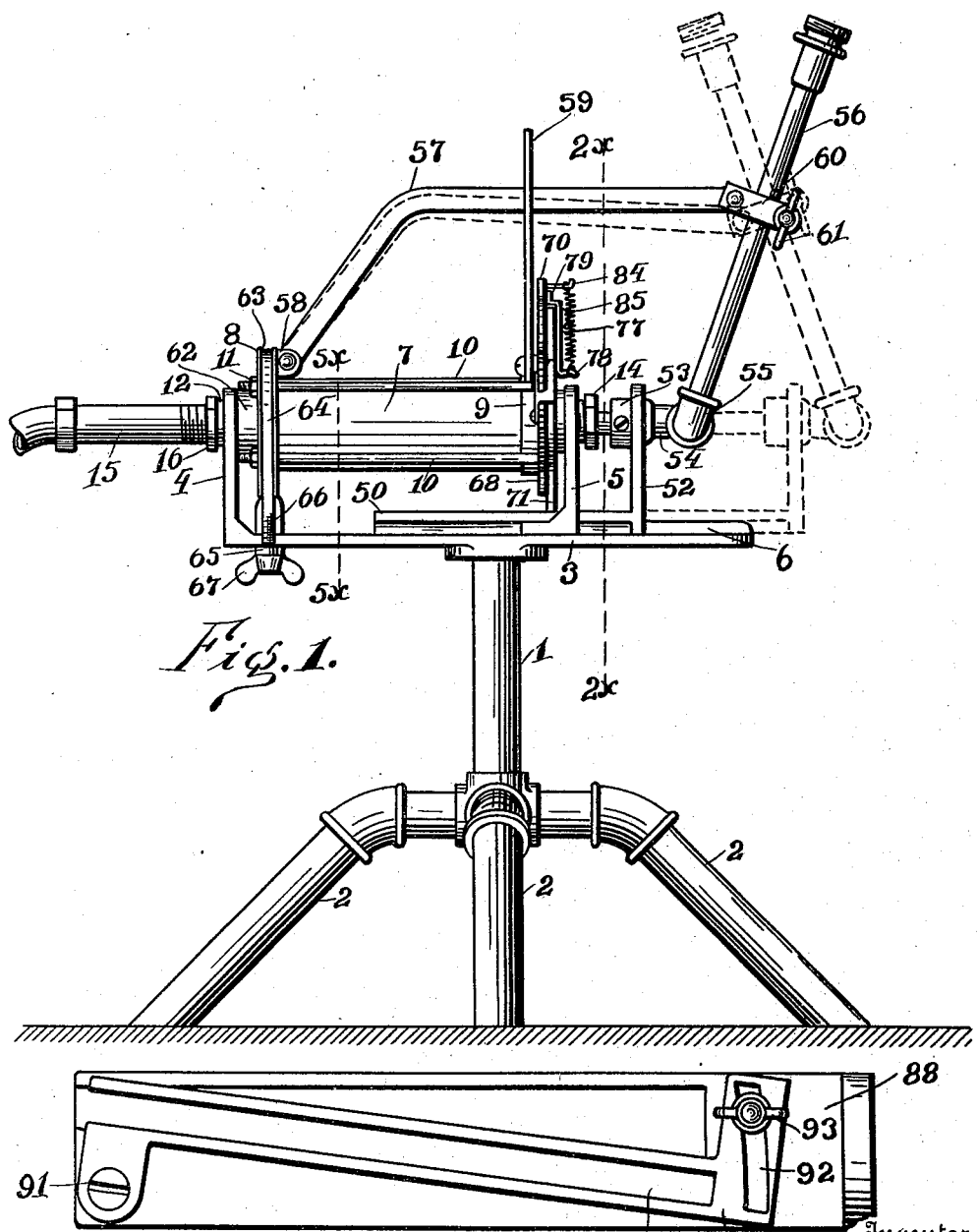

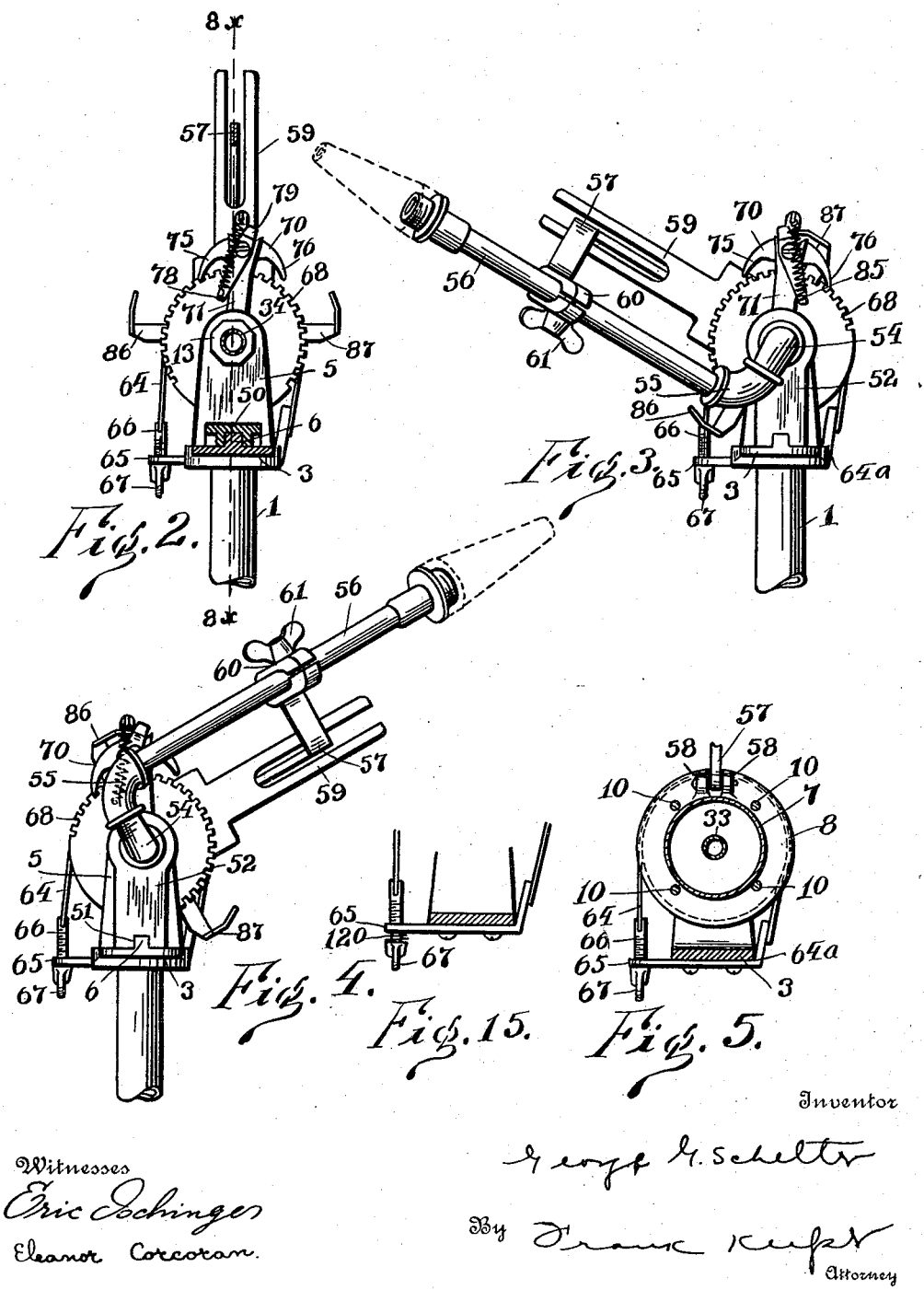

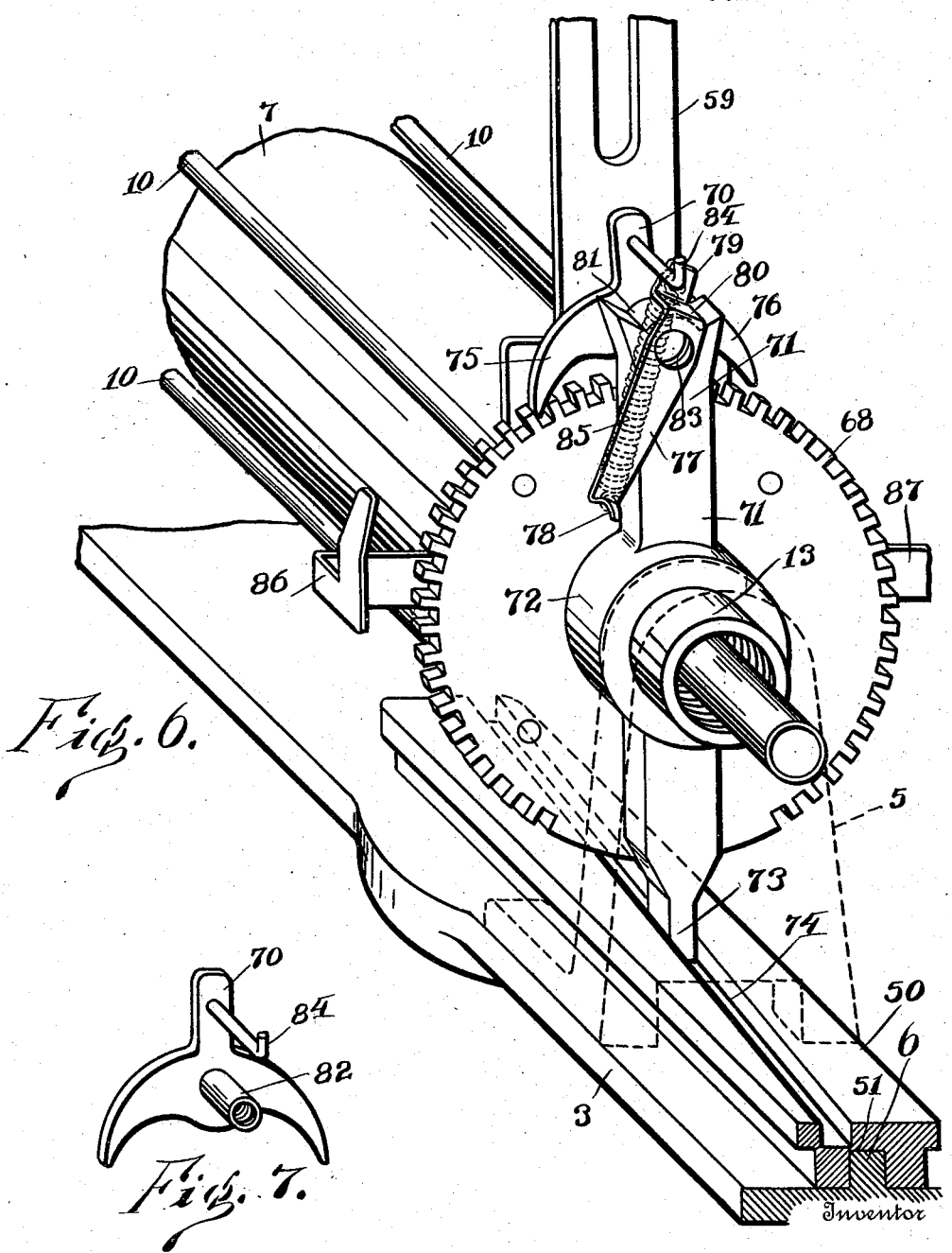

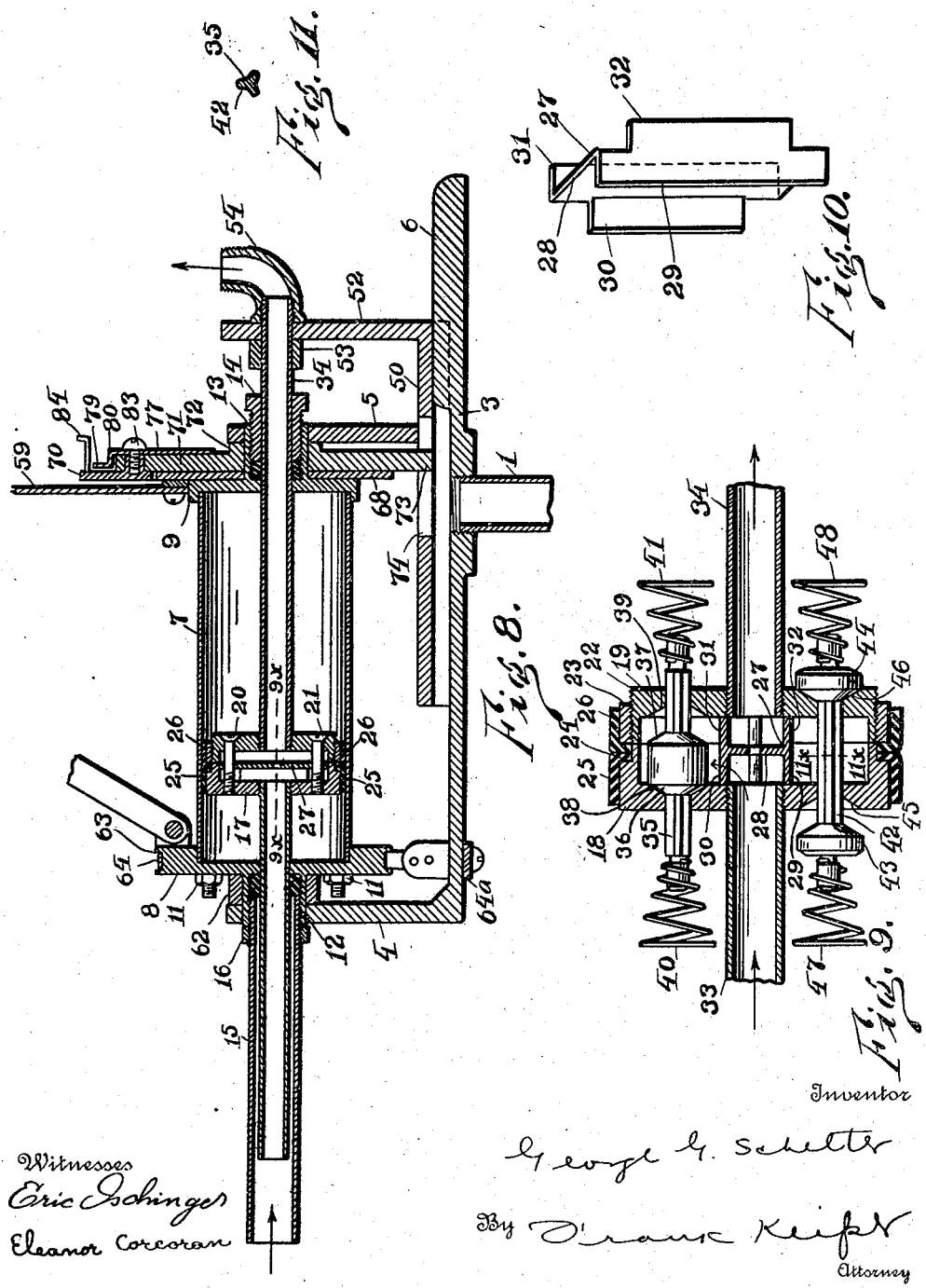

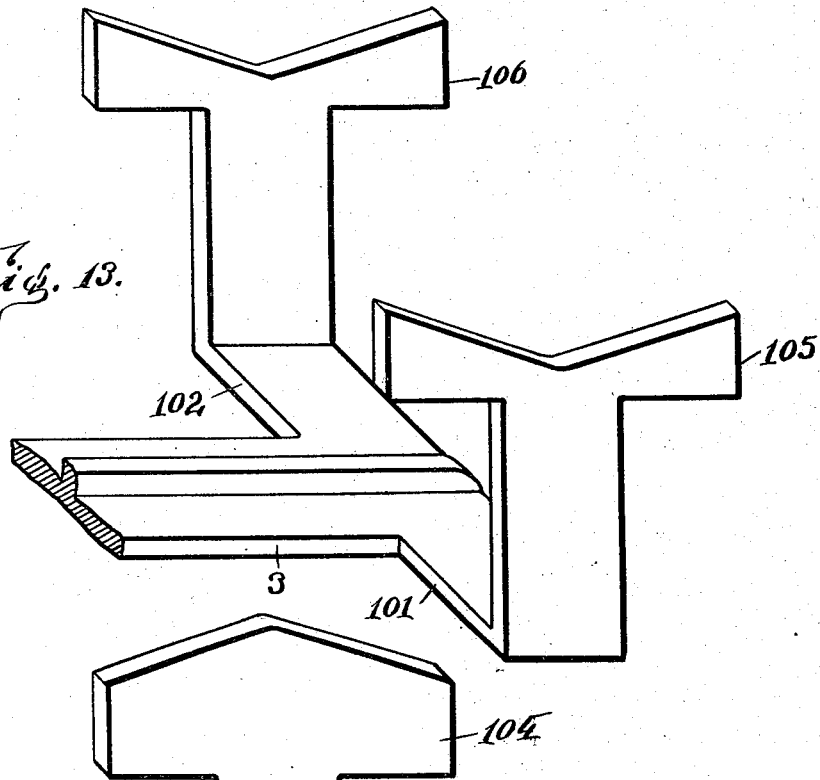
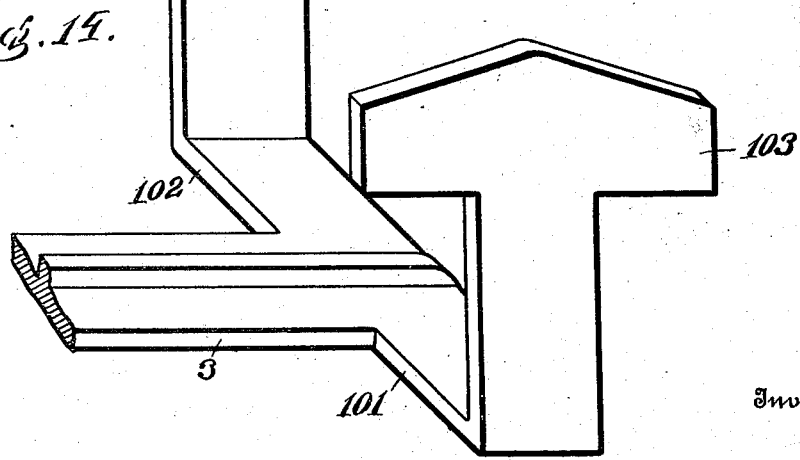

GEORGE G. SCHELTER, OF ROCHESTER, NEW YORK.

AUTOMATIC SPRINKLER.

1,215,202.    Specification of Letters Patent.    Patented Feb. 6, 1917.

Application filed October 3, 1914. Serial No. 864,923.

*To all whom it may concern:*

Be it known that I, GEORGE G. SCHELTER, a citizen of the United States, residing at Rochester, in the county of Monroe and State of New York, have invented certain new and useful Improvements in Automatic Sprinklers, of which the following is a specification.

The object of this invention is to provide an automatic sprinkler for sprinkling lawns, etc.

Another object of the invention is to provide a sprinkler that will throw the water in a continuous stream from one or more nozzles, said nozzle or nozzles being moved continuously through a considerable angular sweep at successive elevations.

These and other objects of the invention will be fully illustrated in the drawings, described in the specification and pointed out in the claims at the end thereof.

In the drawings, Figure 1 is a side elevation of my improved sprinkling apparatus.

Fig. 2 is a vertical section on the line 2ˣ—2ˣ of Fig. 1.

Figs. 3 and 4 are end elevations of the machine showing the nozzle in different positions.

Fig. 5 is a vertical section on the line 5ˣ—5ˣ of Fig. 1.

Fig. 6 is a detail perspective view of the ratchet mechanism for changing the elevation of the nozzle and the parts associated therewith.

Fig. 7 is a perspective view of the pawl by which the elevation of the nozzle is controlled.

Fig. 8 is a longitudinal section on the line 8ˣ—8ˣ of Fig. 2.

Fig. 9 is a horizontal section on the line 9ˣ—9ˣ of Fig. 8 showing the hollow piston, partition plate and valves.

Fig. 10 is a perspective view of the partition plate carried in the hollow piston.

Fig. 11 is a section on the line 11ˣ—11ˣ of Fig. 9.

Fig. 12 is a detail view of an improved form of the cam for controlling the elevation of the nozzle.

Figs. 13 and 14 are detail perspective views of a pair of cams for guiding the nozzle while moving back and forth in the lower elevations.

Fig. 15 shows a modification in the adjustment of the band break.

In the drawings, like reference numerals refer to like parts.

In the drawings reference numeral 1 indicates an upright standard supported on legs 2, 2, 2. On top of this standard is a base plate 3 on which the apparatus is mounted.

On the plate 3 is provided the upright 4 which is preferably integral therewith and the upright 5 removable therefrom. In these uprights are provided the bearings by which the cylinder is supported and in which it is adapted to oscillate. On the plate 3 is formed the guide 6.

On the uprights 4 and 5 is mounted the cylinder 7, having the heads 8 and 9 which heads are suitably recessed to receive the ends of the cylinder and are clamped thereto by the tie rods 10, 10, 10, 10, which are suitably threaded at one end to receive the nuts 11, the other end of each of the tie rods being fastened to the head 9 in any suitable manner. The head 8 is provided with a hub 12 and the head 9 is provided with a hub 13, both of which hubs are internally threaded to receive stuffing boxes, the stuffing box 14 being provided in the hub 13 and the tube 15 and nut 16 forming a stuffing box for the hub 12.

Within the cylinder is mounted to slide the piston 17, which piston is made up as follows:

The flanged disks 18 and 19 are provided which are clamped together by the screws 20 and 21. These disks inclose an opening between them making the piston hollow. The disk 19 is provided with a male thread 22 on which the nut 23 rotates between which nut and the shoulder 24 on the disk 18 the packing strips 25 and 26 are clamped. These packing strips form a tight joint between the piston and the cylinder. Inside of the hollow piston is provided the partition 27 which partition divides the space within the piston into two chambers. The partition 27 is provided with two holes through which the screws 20 and 21 pass by which it is held in place. This partition is formed with a web 28 having flanges on each end thereof being formed substantially in the shape of an I beam. As shown in Fig. 10 on one side of the web 28 the flange 29 runs the full length thereof while the flange 30 is cut away at each end to form openings. On the other side the flange 31 runs the full length of the web 28 while the flange 32 is cut away at each end being substantially the same length as the flange 30.

This partition 27 is placed in the piston transversely of the cylinder. Into the flange disk 18 is threaded the tube 33 and into the disk 19 is threaded the tube 34. The water flows into the apparatus through the tube 33 and out of the apparatus through the tube 34, the direction of the flow being indicated by the arrows in Figs. 8 and 9. To pass from the tube 33 into the tube 34 the water passes into one of the piston chambers, from thence into the ends of the cylinder alternately and thence into the other piston chamber and out through the tube 34. If desired the web 28 may be provided with a hole extending through it permitting a portion of the water to pass directly from the tube 33 to the tube 34 which hole however must be small enough to force enough of the water to pass through the piston chamber and the cylinder to secure the reciprocation of the piston, it being understood that the larger this hole is made the slower will the piston reciprocate.

The water passes from the tube 33 through the openings in the flange 30 into the upper half of the piston chamber as indicated by the arrow at the top of Fig. 9. In this piston chamber is mounted the valve stem 35 on which inside of the piston are provided the valves 36 and 37, which valves engage with the valve seats 38 and 39 formed on the inside of the disks 18 and 19. The valve stem 35 is grooved as shown in Fig. 11 so as to provide passage ways therein between it and the disks 18 and 19 permitting the water to flow from the upper chamber past the valve stem into the cylinder at one end or the other of the piston.

As shown in Fig. 9 the water will flow into the cylinder at the right of the piston and as the cylinder fills the piston will be forced to the left. The ends of the valve stem 35 are provided with the buffer springs 40 and 41. As the piston moves to the left the spring 40 comes into contact with the cylinder head against which it is compressed as the piston advances until finally the force of the spring is sufficient to move the valve stem 35 to the right closing the valve 37 and opening the valve 36, which will cause the water to fill the left end of the cylinder driving the piston in the reverse direction.

The manner in which the water escapes from the right end of the cylinder will now be described.

At the bottom of the piston as shown in Fig. 9 is provided the valve stem 42, which stem is shaped in cross section like the valve stem 35, it being understood that the openings in the disks 18 and 19 through which the stems 35 and 42 travel are circular. On the ends of the valve stem 42 are provided the valves 43 and 44, which valves are adapted to engage with the seats 45 and 46 in the disks 18 and 19. At each end of the valve stem 42 are provided the compression springs 47 and 48. As the pistons move to the left in Fig. 9 the spring 47 will engage with the cylinder head and be compressed against it as the piston continues its movement until finally the force of the spring is sufficient to move the valve stem 42 to the right closing the valve 43 and opening the valve 44.

During this movement of the piston to the left the water that is contained at the left end of the cylinder will flow past the valve 43 and stem 42 into the lower chamber of the piston and from there past the openings at the ends of the flange 32 into the tube 34. In this manner the opposite ends of the cylinder are alternately filled and emptied.

Mounted to slide on the plate 3 is the cam plate 50 having a groove 51 in the bottom thereof which is adapted to engage the guide 6 formed on the plate 3. On this cam plate is an upright 52 the top of which is recessed to receive and support the tube 34 which passes therethrough. On the tube 34 is placed a collar 53 by which the thrust of the piston is communicated in one direction from the tube 34 to the upright 52. The end of the tube 34 is threaded to receive the elbow 54 between which elbow and collar 53 the upright 52 is securely held, and by this elbow the upright is driven in the other direction. Swiveled on the elbow 54 is a second elbow 55 to which is connected the pipe 56 on the end of which may be fastened the nozzle, any of the ordinary types of nozzles being adapted for use in connection with this machine.

My invention contemplates the rapid automatic swinging of the nozzle and the pipe 56 back and forth around the small end of the elbow 54 and the slow gradual swinging of the cylinder 7 and the nozzle together gradually raising or lowering the nozzle as it travels back and forth causing the nozzle to move through a zigzag path. The mechanism by which the rapid swinging of the nozzle is secured will now be described.

Pivotally mounted on the cylinder head 8 is the link 57, the lugs 58 being provided on the cylinder head 8 to furnish a bearing therefor. On the cylinder head 9 is provided the forked guide 59 in which the link 57 is guided as it swings up and down. As the piston is driven to the right and left as heretofore described it carries the tube 34 with it and this in turn will carry the elbows 54, 55 and tube 56. In order to cause the tube 56 to oscillate a clamp 60 is provided which clamp is pivotally attached to the link 57, the clamp being securely fastened to the tube 56 by means of the thumb nut 61. As the tube 34 reciprocates the lower end of the tube 56 will swing back and forth causing the tube 56 to rock around the clamp 60 as a center, the link 57 rising and falling slightly during the swinging of the tube. This will cause the upper end of the tube 56 and its nozzle to swing back and forth in the opposite direction throwing the water through an arc fixed by the travel of the tube 34 and the distance between the elbow 54 and the clamp 56 which distance may be varied at will by raising or lowering the clamp 60 on the tube 56. If the nozzle were held to this particular swinging back and forth it would distribute the water only over a narrow belt, and in order to secure the distribution of the water over a large area I provide for the gradual raising or the lowering of the nozzle by mechanism which I will now describe.

The cylinder 7 and its heads are mounted to rotate in the bearings in the standards 4 and 5 heretofore described. Between the cylinder head 8 and the standard 4 the collar 62 is provided. On the head 8 is formed a groove 63, around which a band brake 64 is stretched, one end of the band brake being rigidly fastened to the base plate 3 at 64ª, the other end of the band brake being fastened to an eye in the lug 65, the band terminating in the threaded stud 66 which may be drawn down by the thumb nut 67 so as to throw any desired tension on the cylinder and the cylinder head through the band brake.

On the opposite end of the cylinder is provided the ratchet disk 68 having teeth thereon spaced at regular intervals. This ratchet disk is integral with the cylinder head 9. Mounted to engage with the teeth of the ratchet disk is the pawl 70, which pawl is carried on the lever 71, which lever has the hub 72 thereon by which it has a bearing on the hub 13 of the cylinder head 9, the lower end of the lever extending downwardly below the hub and terminating in the tongue 73, which tongue engages with the slot 74 in the cam plate 50. This cam plate 50 moves back and forth with the reciprocation of the piston, being connected thereto by the upright 52 and as it moves back and forth the lever 71 rocks on its bearing and causes the pawl 70 to reciprocate over the ratchet disk 68. The pawl 70 is a double acting pawl and is provided with two teeth 75 and 76, which teeth can alternately engage with the teeth of the ratchet disk for the purpose of driving it in opposite directions. While the pawl is held on the center neither of the teeth will engage the ratchet disk but when the pawl is thrown over the center in either direction one or the other of the teeth will engage and drive the ratchet disk accordingly. The position of the pawl is determined by mechanisms which will now be described.

Pivotally mounted near the top of the lever 71 is the lever 77, at the bottom of which is the upturned end 78. At the top of this lever is provided the off set end 79 connected to the lever 77 by the shoulder 80. The top of the lever 71 is recessed with a curved seat 81 over which the shoulder 80 travels and on either side of this curved seat are shoulders with which the off set end 79 engages for the purpose of arresting its movement in either direction.

The pawl 70 is provided with a sleeve 82, see Fig. 7, which passes through a suitable opening near the top of the lever 71, which sleeve is threaded to receive the screw 83 by which it is held on the lever 71. The lever 77 heretofore described is mounted to rock on the screw 83 independently of the pawl 70.

At the top of the pawl 70 is carried a hook 84 between which hook and the upturned end 78 of the lever 77 is stretched a spring 85 by which the pawl is held on the one side or the other of its center according to the position of the upturned end 78 of the lever 77. With the parts in the position shown in Fig. 6 the pawl 70 will engage the ratchet wheel 68 on the left of the center and cause the ratchet wheel and cylinder to feed in that direction, which feeding is secured by the oscillation of the lever 71 due to the reciprocating of the cam plate 50. It will be seen that the lever 71 will oscillate back and forth through a comparatively small arc and the ratchet 70 will move back and forth through the same arc at the end of every backward movement, taking a fresh hold on the ratchet wheel 68 and carrying it forward with it. The ratchet wheel and the cylinder are held in the position in which they are left by the ratchet by the frictional engagement of the band brake therewith.

On either side of the ratchet wheel are mounted the brackets 86 and 87, the upturned ends of which are adapted to engage with the upturned end 79 of the lever 77, carrying it with it for the purpose of reversing its position and reversing the position of the pawl 70. After the pawl 70 is reversed the lever 71 will continue to oscillate and the pawl will then cause the cylinder to move step by step in the opposite direction.

It will be understood that the cam 74 moves the lever 71 and pawl 70 a little farther than is necessary to move the cylinder one additional tooth. It will also be understood that the pitch of this cam may be increased so as to cause the ratchet to feed by turning the cylinder in successive steps of two or more teeth, and to give a considerable range in this adjustment, instead of the rigid single piece cam plate shown in Fig. 6, I may substitute therefor the adjustable cam plate shown in Fig. 12, in which case the plate 88 will reciprocate with the tube 34 carrying with it the plate 89, which plate has a cam slot 90 thereon. The plate 89 is pivotally mounted on the plate 88 at 91 and at its forward end is provided with the curved slot 92 which is engaged by a thumb screw 93 carried on the plate 88 by which it may be clamped in any one of a series of angular positions, which will vary the throw of the lever 71, causing the ratchet 70 to feed by steps of one, two or even more teeth as may be desired. If the cam 90 is made parallel with the guide 6 the ratchet will not feed at all. The operation of this part of my apparatus is to cause the nozzle to swing back and forth through a gradually ascending or descending zig zag path, the mechanism reversing itself so as to cause the nozzle to swing backward along the same path when it has reached the end of its movement in one direction as fixed by the brackets 86 and 87.

The operation of my sprinkler is as follows:

The hose is attached to the tube 15 shown at the left of Figs. 1 and 8, the usual form of hose coupling being provided for this purpose. The water is then turned on and flows through the tube 33 into the upper chamber of the hollow piston and along the valve stem 35 into one end of the cylinder or the other, driving the piston to the opposite end of the cylinder. When the piston has reached the end of its movement the valve stems 35 and 42 are operated to shift the valves carried thereby causing the water to fill the other end of the cylinder, driving the piston back and causing the water to discharge from the first named end of the cylinder through the lower chamber in the piston, through the tube 34 and tube 56. The reciprocation of the piston will cause the oscillation of the tube 56. As the tube 34 reciprocates the cam 74 will be operated causing the oscillation of the lever 71 and thereby the gradual feeding of the ratchet disk 68, which will carry the forked guide 59 around with it and raise or lower the nozzle step by step as it swings back and forth, thus securing the even distribution of the water over a large area.

In Figs. 13 and 14, I have shown additional details of the machine by which the sprinkling from the nozzle may be the more accurately controlled under particular conditions. It will frequently be desired to sprinkle the grass along a straight wall or along the wall of the house without wetting the walk or the house. This makes it necessary to control the nozzle so that the water falling farthest therefrom will fall substantially along a straight line.

As the nozzle ordinarily moves back and forth, due to the motion of the piston, the water will follow in a path, which will substantially represent the arc of a circle. If it is desired to make the water fall along a straight line, the nozzle may be moved to secure this result by using the cams shown in Figs. 13 and 14. It is assumed that water will travel its greatest distance when the nozzle from which it is thrown is set at an angle of about 40° above the horizontal. If the rocking of the cylinder is limited so that the nozzle is limited to a travel in the vertical arc of 50° on either side of the vertical position, the cam shown in Fig. 14 will be used. This cam may be described as follows:

Attached to the supporting plate 3 are the brackets 101 and 102, having uprights thereon, which support the cam plates 103 and 104. These cam plates have two oppositely disposed cams thereon, which cams are of the same length and pitch, the high point of each of the cams being at the center. These cams will be placed on the machine so that the nozzle or tube 56 will rest thereon when in their lowest position and as the tube travels back and forth thereon it will rise and fall through an angle of 10° or 15° to accommodate, which without the interfering with the regular rocking of the cylinder 7, the width of the slot in the forked guide 59 must be increased so that the tube 56 may be raised and lowered by the cam 103 or 104 without moving the guide. The low point of the cam at the ends of the cam plate will support the nozzle in a position that will give the water its greatest travel, namely about 40° above the horizontal. The middle point of the cam will raise the nozzle so as to shorten the travel of the water and while traveling along this cam the water will be distributed along a straight line connecting the points reached by the water when the nozzle is held in its lowest positions by the ends of the cam.

If it is desired the cam shown in Fig. 13 may be used, in which case the outer ends of the cams 105 and 106 will raise the nozzle to about 40° above the horizontal or less as may be desired so as to give the greatest travel to the water when it emerges from the nozzle at the end of its stroke and the middle of the cam will depress the nozzle so that when in mid position the water falling farthest therefrom will follow along the straight line connecting the points reached by the nozzle at its highest position. The distribution of water by the cam shown in Fig. 14 may be represented by the cord of an arc of a circle while the distribution of water by the cam, shown in Fig. 13 will follow a tangent to the arc. It will also be understood that the water will not fall entirely on a given theoretical point but will be scattered over a strip of considerable width which may be governed by the shape of the outlet or outlets of the nozzle.

In Fig. 15 I have shown a modification in the form of a band brake in which the thumb nut 67 instead of bearing directly against the lug 65 compresses a spring 120 between the nut and the lug so that a yielding tension is put on the band brake.

I claim:

1. In a sprinkling machine the combination of a nozzle, and means for moving said nozzle back and forth through a series of parallel paths at successive elevations, said means comprising a cylinder having a piston working therein, said piston being driven by the water flowing through said machine.

2. In a sprinkling machine the combination of a nozzle, an arm on which said nozzle is adapted to swing back and forth, a cylinder, a piston working in said cylinder, said piston causing said arm to swing back and forth horizontally, and means to change the elevation of the nozzle.

3. In a sprinkling machine the combination of a nozzle, an arm on which said nozzle is adapted to move back and forth, a cylinder having a piston working therein, said piston causing said arm to swing back and forth horizontally, and means to change the elevation of the nozzle through a series of step by step movements in the same direction.

4. In a sprinkling machine the combination of a nozzle, an arm on which said nozzle is adapted to move back and forth, a cylinder having a piston working therein, said piston causing said arm to swing back and forth horizontally, means to change the elevation of the nozzle through a series of step by step movements in the same direction, and means for reversing the movement of the nozzle at the end of said movement in one direction.

5. In a sprinkling machine the combination of a piston having a chamber therein, a partition extending across said chamber, said partition having flanges on both sides thereof to form two channels parallel to the ends of said piston, said flanges being adapted to bear against the ends of said piston and hold said partition in place in said piston.

6. In a sprinkling machine the combination of a piston, a chamber therein, a partition extending across said chamber, said partition having flanges on both sides thereof to form two channels parallel to the ends of said piston, said flanges being adapted to bear against the ends of said piston and hold said partition in place in said chamber, said partition and said channels dividing said chamber into two parts.

7. In a sprinkling machine the combination of a piston, a chamber therein, a partition extending across said chamber, said partition having flanges on both sides thereof to form two channels parallel to the ends of said piston, said flanges being adapted to bear against the ends of said piston and hold said partition in place in said chamber, said partition and said channels dividing said chamber into two parts, one of said channels communicating with one part of said chamber, the other of said channels communicating with the other part of said chamber.

8. In a sprinkling machine the combination of a support, a cylinder mounted to rotate in said support, a piston mounted to reciprocate in said cylinder, a tube connected to each end of said piston, one tube extending through the forward end of the cylinder and the other tube extending through the rear end of the cylinder, a cam plate connected to the first named tube to reciprocate therewith, a cam in said plate, and a lever mounted to oscillate on said support, one end of said lever being engaged with the cam in said plate and being oscillated thereby, and connections between the other end of said lever and the cylinder whereby a step by step motion is imparted to said cylinder on the oscillation of said lever.

9. In a sprinkling machine the combination of a support, a cylinder mounted to oscillate in said support, a piston mounted to reciprocate in said cylinder, a plate mounted to reciprocate on said support, said plate being connected to and reciprocating with said piston, a lever mounted to oscillate on said support, a cam in said plate, one end of said lever being engaged with said cam whereby said lever is oscillated on the reciprocation of said cam, and a connection between said lever and said cylinder whereby said cylinder is rocked through a step by step motion on the oscillation of said lever.

10. In a sprinkling machine the combination of a support, a cylinder mounted to oscillate in said support, a piston mounted to reciprocate in said cylinder, a plate mounted to reciprocate on said support, said plate being connected to and reciprocating with said piston, a lever mounted to oscillate on said support, a cam in said plate, one end of said lever being engaged with said cam whereby said lever is oscillated on the reciprocation of said cam, a connection between said lever and said cylinder whereby said cylinder is rocked through a step by step motion on the oscillation of said lever, and means for reversing the step by step movement of said cylinder at a predetermined point.

11. In a sprinkling machine the combination of a cylinder, a piston mounted to reciprocate in said cylinder, connections with said piston and cylinder whereby water is adapted to pass through said cylinder and said piston and reciprocate said piston, a nozzle through which the water passes after leaving the cylinder, and connections between said piston and said nozzle for oscillating the nozzle on the reciprocation of the piston.

12. In a sprinkling machine the combination of a cylinder, a piston mounted to reciprocate therein, a tube connected to said piston and passing through the end of the cylinder, said tube reciprocating with said piston, and a tube mounted outside of said cylinder, having a swiveled connection with said first named tube, said second named tube being mounted to rock on the reciprocation of said piston.

13. In a sprinkling machine the combination of a tube mounted to swing back and forth on an axis, means for constantly and automatically shifting said axis at right angles to the swinging motion of said tube, means to adjust the position of said axis on said tube.

14. In a sprinkling machine the combination of a tube for distributing water, a clamp fastened to said tube, a link pivotally connected to said clamp to hold it, and a piston connected to one end of said tube and operating to swing said tube around said clamp.

15. In a sprinkling machine the combination of a cylinder mounted to oscillate, a distributing tube mounted to oscillate with said cylinder, a feeding mechanism for oscillating said cylinder through a step by step movement, and a brake on the said cylinder for yieldingly holding said cylinder against movement.

16. In a sprinkling machine the combination of a cylinder and a distributing tube, a link pivotally mounted on said cylinder, said link being pivotally connected to said sprinkling tube, and a piston mounted to reciprocate in said cylinder, said piston being connected to and causing the reciprocation of one end of said sprinkling tube, causing said tube to move around the end of said link.

17. In a sprinkling machine the combination of a cylinder and a distributing tube, a link pivotally mounted on said cylinder, said link being pivotally connected to said sprinkling tube, a piston mounted to reciprocate in said cylinder, said piston being connected to and causing the reciprocation of one end of said sprinkling tube, causing said tube to move around the end of said link, and a fork mounted on said cylinder, said fork loosely engaging with and guiding said link.

18. In a sprinkling machine the combination of a cylinder, a piston mounted to reciprocate therein, said piston being hollow and having a partition extending across said hollow piston to form two chambers therein, said partition having flanges on both sides thereof to form two channels parallel to the ends of said piston, said partition having a hole therethrough.

19. In a sprinkling machine the combination of a cylinder, a piston mounted to reciprocate therein, said piston being hollow, a partition extending across said hollow piston to form two chambers therein, said partition having flanges on both sides thereof to form two channels parallel to the ends of said piston, a tube to supply water to one of said chambers and a tube to drain water from the other of said chambers, said partition having a hole therethrough permitting part of the water to pass directly therethrough from one tube to the other tube.

20. In a sprinkling machine the combination of a support, a cylinder mounted to oscillate on said support, a plate mounted to reciprocate on said support, means to reciprocate said plate, a lever mounted to oscillate on said support, a cam in said plate, one end of said lever being engaged with said cam whereby said lever is oscillated on the reciprocation of said cam, and a connection between said lever and said cylinder whereby said cylinder is rocked through a step by step motion on the oscillation of said lever, said cam being adjustable to vary the stroke of said lever.

21. In a sprinkling machine the combination of a cylinder mounted to oscillate, a distributing tube mounted to oscillate with said cylinder, a feeding mechanism for oscillating said cylinder through a step by step movement, and a brake on the said cylinder for yieldingly holding said cylinder against movement, and yielding means on end of the brake for adjusting the tension of said brake.

22. In a sprinkling machine the combination of a tube, a bracket pivotally connected to said tube, a nozzle carried on one end of said tube and means on the other end of said tube to rock said tube on the end of said bracket, means to move said bracket at right angles to the movement of said tube.

23. In a sprinkling machine the combination of a tube, a bracket pivotally connected to said tube, a nozzle carried on one end of said tube and means on the other end of said tube to rock said tube on the end of said bracket, a cylinder, a piston mounted to reciprocate therein, said piston being hollow and having a partition extending across said hollow portion of said piston, said partition having flanges on both sides thereof to form two channels parallel to the end of said piston and dividing said hollow portion of said piston into two chambers, one of said channels communicating with one of said chambers, the other of said channels communicating with the other of said chambers.

24. In a sprinkling machine the combination of a frame, a cylinder mounted to swing in said frame, a piston mounted to reciprocate in said cylinder, a piston rod connected to said piston and projecting out from said cylinder, means operated upon the reciprocation of said piston rod to intermittently rotate said cylinder in said frame.

25. In a sprinkling machine the combination of a frame, a cylinder mounted to swing in said frame, a piston mounted to reciprocate in said cylinder, a piston rod connected to said piston and projecting out from said cylinder, means operated by the reciprocation of said piston rod to intermittently rotate said cylinder in said frame, means for reversing the rotation of said cylinder.

26. In a sprinkling machine the combination of a frame, a cylinder mounted to swing in said frame, a piston mounted to reciprocate in said cylinder, a piston rod connected to said piston and projecting out from said cylinder, means operated by the reciprocation of said piston rod to intermittently rotate said cylinder in said frame, means for reversing the rotation of said cylinder, a tube pivotally mounted on the end of said piston rod, an arm pivotally mounted on said cylinder, said tube being mounted to swing on the end of said arm, said piston rod operating to rock said tube on the end of said arm, and move said arm simultaneously in a plane at right angles to the movement of said tube.

27. In a sprinkling machine the combination of a frame, a cylinder mounted to swing in said frame, a piston mounted to reciprocate in said cylinder, a piston rod connected to said piston and projecting out from said cylinder, means operated by the reciprocation of said piston rod to intermittently rotate said cylinder in said frame, means for reversing the rotation of said cylinder, a tube pivotally mounted on the end of said piston rod, an arm pivotally mounted on said cylinder, said tube being mounted to swing on the end of said arm, said piston rod operating to rock said tube on the end of said arm, and move said arm simultaneously in a plane at right angles to the movement of said tube, means for increasing and decreasing the throw of the free end of the tube.

28. In a sprinkling machine the combination of a frame, a cylinder mounted to swing in said frame, a piston mounted to reciprocate in said cylinder, a piston rod connected to said piston and projecting out from said cylinder, means operated by the reciprocation of said piston rod to intermittently rotate said cylinder in said frame, means for reversing the rotation of said cylinder, a tube pivotally mounted on the end of said piston rod, an arm pivotally mounted on the cylinder, said tube being mounted to swing on the end of said arm, said piston rod operating to rock said tube on the end of said arm, and move said arm simultaneously in a plane at right angles to the movement of said tube, means for increasing or decreasing the throw of the free end of the tube, and means for increasing or decreasing the angular movement of said cylinder.

In testimony whereof I affix my signature in presence of two witnesses.

GEORGE G. SCHELTER.

Witnesses:
ERIC ISCHINGER,
EDNA K. BOOTH.

Copies of this patent may be obtained for five cents each, by addressing the "Commissioner of Patents, Washington, D. C."